(12) United States Patent
Salokatve et al.

(10) Patent No.: US 10,807,190 B2
(45) Date of Patent: Oct. 20, 2020

(54) LASER PROCESSING APPARATUS AND METHOD AND AN OPTICAL COMPONENT THEREFOR

(71) Applicant: Corelase Oy, Tampere (FI)

(72) Inventors: Arto Salokatve, Tampere (FI); Jarno Kangastupa, Tampere (FI); Tiina Amberla, Tampere (FI); Tuomo Konnunaho, Tampere (FI)

(73) Assignee: Corelase Oy, Tampere (FI)

( * ) Notice: Subject to any disclaimer, the term of this patent is extended or adjusted under 35 U.S.C. 154(b) by 265 days.

(21) Appl. No.: 15/580,751

(22) PCT Filed: Jun. 9, 2015

(86) PCT No.: PCT/FI2015/050402
§ 371 (c)(1),
(2) Date: Dec. 8, 2017

(87) PCT Pub. No.: WO2016/198724
PCT Pub. Date: Dec. 15, 2016

(65) Prior Publication Data
US 2018/0147661 A1    May 31, 2018

(51) Int. Cl.
*B23K 26/06* (2014.01)
*B23K 26/00* (2014.01)
(Continued)

(52) U.S. Cl.
CPC ...... *B23K 26/0608* (2013.01); *B23K 26/0096* (2013.01); *B23K 26/0613* (2013.01);
(Continued)

(58) Field of Classification Search
CPC ............ B23K 26/0608; B23K 26/0613; B23K 26/0096; B23K 26/22; B23K 26/38;
(Continued)

(56) References Cited

U.S. PATENT DOCUMENTS 7,348,517 B2    3/2008  Egawa et al.
8,520,298 B2 *  8/2013  Maryfield ........... H01S 3/06704
                                              359/341.1
(Continued)

FOREIGN PATENT DOCUMENTS

CN    101405635 A    4/2009
CN    101883658 A    11/2010
(Continued)

OTHER PUBLICATIONS

Kosterin et al: Tapered fiber bundles for high power applications. Optical Fiber Comm. Conf Tech Digest, IEEE 6.3..2005, vol. 2, pp. 146-148.
(Continued)

*Primary Examiner* — David J Walczak
(74) *Attorney, Agent, or Firm* — Morrison & Foerster LLP

(57) ABSTRACT

An apparatus and its use for laser processing along with a method and an optical component. A first laser device provides a first optical feed fiber and a second laser device provides a second optical feed fiber. A beam combining means connected to the first and second feed fibers and to a multi-core optical fiber is adapted to form a composite laser beam by having the first optical feed fiber aligned with a first core of the multi-core optical fiber and the second optical feed fiber aligned with at least one second core of the multi-core optical fiber. The first and second cores outputs a composite laser beam to a workpiece to be processed. A control unit individually controls the power density of the output laser beams.

6 Claims, 3 Drawing Sheets

(51) Int. Cl.
*B23K 26/22* (2006.01)
*B23K 26/38* (2014.01)
*B23K 26/08* (2014.01)
*G02B 6/02* (2006.01)
*G02B 6/28* (2006.01)

(52) U.S. Cl.
CPC .......... *B23K 26/0869* (2013.01); *B23K 26/22* (2013.01); *B23K 26/38* (2013.01); *G02B 6/02042* (2013.01); *G02B 6/2821* (2013.01)

(58) Field of Classification Search
CPC ............ B23K 26/0869; G02B 6/02042; G02B 6/2821; G02B 6/35; G02B 6/02; G02B 6/036; H04B 10/17; H04B 10/12
See application file for complete search history.

(56) References Cited

U.S. PATENT DOCUMENTS

| | | | |
|---|---|---|---|
| 8,781,269 | B2 | 7/2014 | Huber et al. |
| 2005/0094952 | A1 | 5/2005 | Gonthier et al. |
| 2009/0154881 | A1 | 6/2009 | Salokatve |
| 2011/0293215 | A1 | 12/2011 | Ruggiero et al. |
| 2013/0223792 | A1 | 8/2013 | Huber et al. |
| 2014/0010508 | A1 | 1/2014 | Matsuo et al. |
| 2014/0263208 | A1 | 9/2014 | Karlsen et al. |

FOREIGN PATENT DOCUMENTS

| | | |
|---|---|---|
| CN | 103097931 A | 5/2013 |
| EP | 0464213 A1 | 1/1992 |
| EP | 1909366 A1 | 4/2008 |
| EP | 2399703 A1 | 12/2011 |
| EP | 2859986 A1 | 4/2015 |
| EP | 2722127 A4 | 6/2015 |
| EP | 2762263 A4 | 3/2016 |
| JP | 2004358521 A | 12/2004 |
| JP | 2013139039 A | 7/2013 |
| TW | 201237478 A | 9/2012 |
| WO | WO2009077637 A1 | 6/2009 |
| WO | WO2014118516 A | 8/2014 |

OTHER PUBLICATIONS

Office Action received for Chinese Patent Application No. 201580080775.7, dated Jul. 1, 2020, 15 pages (9 pages of English Translation and 6 pages of official copy).

* cited by examiner

LASER PROCESSING APPARATUS AND METHOD AND AN OPTICAL COMPONENT THEREFOR

FIELD OF THE INVENTION

The invention relates to a laser processing apparatus and method. In particular, the invention concerns cutting and welding of materials by laser processing.

BACKGROUND OF THE INVENTION

When welding metal with a laser beam, the laser beam is typically condensed through a condenser lens into a spot of 100-500 μm to increase energy density and instantaneously heat the workpiece to a metal melting point of 1500 degrees or over so that the workpiece melts. At the same time, an assist gas may be fed to prevent corrosion of the molten metal. A laser beam of a one-micrometer waveband from a solid-state laser or fiber laser realizes a very high optical energy intensity and absorbance on a metallic work compared with a laser beam in the ten-micrometer waveband from of a $CO_2$ laser. However, if a one-micrometer waveband laser beam with a Gaussian beam is used with an oxygen assist gas to cut a mild steel sheet workpiece, the melt width on the top face of the workpiece widens unnecessarily and impairs kerf control. In addition self-burning may occur to deteriorate the quality of the laser cutting.

In EP2762263, US20110293215, U.S. Pat. No. 7,348,517, JP2013139039, EP0464213, EP2399703, EP 2722127 and WO2009003484 is discussed various solutions for cutting materials, which are based on ring-shaped laser beams, which provide an intensity profile that can be described as having an annular or "doughnut"-like shape. It has been observed that cutting of a metal of a given thickness can be performed at much lower power when using a doughnut beam instead of more conventional beam profiles, and may yield good results in terms of cutting speed and quality.

U.S. Pat. No. 8,781,269 discloses various arrangements to direct laser beams to a multi-clad fiber to generate different beam profile characteristics of an output laser beam, where an input laser beam is electively coupled into an inner fiber core or into an outer ring core.

The prior art materials processing applications strive to maximize the brightness of the laser beam. Brightness is defined as the power per unit solid angle and unit area. As an example of the importance of brightness, increasing the brightness of a laser beam means that the laser beam can be used to increase the processing speed or the material thickness. High brightness laser beams can be obtained from e.g. fiber lasers and thin disc lasers. Direct diode lasers have constantly also improved in brightness, but commercial direct diode lasers for materials processing do not quite yet reach the brightness of fiber or thin-disc lasers.

Laser processing performed according to prior art have some important drawbacks. In welding applications, the high-power laser based so-called keyhole welding technique tends to produce excessive heat, resulting in excessive hardening and deformation of the weld seam during cooling. The shape of the weld seam is, due to the very nature of laser beam, deep and narrow in cross-section, creating large temperature gradients and mechanical stresses at the welding seam. In cutting applications, especially of thick materials, the laser beam needs to have a high intensity and a relatively broad focal spot, in order for vaporize and otherwise remove the molten metal, to avoid it from welding the pieces together again after the laser beam. Such high-power cutting leaves the cut surfaces somewhat irregular in shape. Accordingly, there is a need for improved methods and devices for laser welding and cutting.

The invention is based on the insight of combining keyhole laser cutting or welding with heat conduction welding. Laser keyhole welding is used when material needs to be joined with a higher thickness to width aspect ratio. A laser beam with a high intensity heats the material above evaporation temperature resulting in a deep capillary called a keyhole at the leading edge of the molten metal. As the heat source progresses, the molten metal fills in behind the hole to form a weld bead. Inert gas shields the process and protects it during the keyhole welding process from unwanted oxidization. By emitting single pulses with very high pulse intensity, spot welds can also be achieved such as is used in the electronics industry.

Keyhole laser cutting is a similar technique where the concentrated heat source penetrates through a work-piece, and the molten metal is removed by some means to prevent it from forming a weld bead.

Heat conduction welding is applicable for sheet metal up to a material thickness of approximately 2 mm. A laser beam, focused on the seam, heats the material and that heat is quickly conducted through the sheets causing it to melt and join together. The focusing optic is moved along the seam while it focuses the laser beam to the sample, leaving a high quality weld. For conduction welding, lasers with lower brightness, like direct diode lasers, can be used.

In an effort to find a laser technique that could be used both for cutting and welding, and which also would remove some of the disadvantages of keyhole welding as performed according to prior art, the inventors made the observation that when keyhole and conduction laser sources are combined in a special configuration, the problems were solved.

SUMMARY OF THE INVENTION

The specific solution and its embodiments are defined in the appending claims.

According to one aspect of the invention a laser processing apparatus comprises:
- at least one first laser device, each providing at least one first optical feed fiber with a first laser beam;
- at least one second laser device, each providing at least one second optical feed fiber with a second laser beam;
- beam combining means connected to said first and second feed fibers and to a multi-core optical fiber, the combining means being adapted to form a composite laser beam by having said at last one optical feed fiber aligned with a first core of said multi-core optical fiber, and said at least one second optical feed fiber aligned with at least one second core of said multi-core optical fiber;
- said first and second cores being adapted to at a laser processing head, to direct a composite laser beam comprising a first and second output laser beams to a workpiece to be processed; and
- a control unit functionally connected to said first and second laser devices, to individually control the power density in said first and second output laser beams.

According to some embodiments, the first core of said multi-core optical fiber has a circular cross-section, and the second core has an annular shape concentric to the first core. Thereby the center of a first optical feed fiber, that is adapted to carry or guide a first laser beam, may be aligned with the center of the first core, and the center of at least one second optical feed fiber, that is adapted to carry or guide a second laser beam, may be aligned between the inner and outer diameters of the second annular core. In one embodiment, the second optical feed fibers are four and are symmetrically interfaced with the cross-section of the second annular core.

In some embodiments, the first laser device is a fiber laser and the second laser device is a diode laser. In some further embodiments, both the first and the second laser device may be fiber lasers.

According to a second aspect of the invention, a method for processing a workpiece with a laser beam comprises the steps of:
 providing at least one first laser beam from at least one first optical feed fiber connected to at least one first laser device;
 providing at least one second laser beam from at least one second optical feed fiber connected to at least one second laser device;
 combining said first and second laser beams into a multi-core optical fiber by aligning said at least one first optical feed fiber with a first core of said multi-core optical fiber and said at least one second optical feed fiber with a second core of said multi-core optical fiber;
 directing a composite laser beam comprising first and second output beams from said multi-core optical fiber to a workpiece to be processed; and
 controlling with a control unit which is functionally connected to said first and second laser devices, the power density in said first and second output beams individually.

According to a third aspect of the invention, an optical component for combining and aligning laser beams comprises:
 a body portion consisting of a fused glass tube;
 an input end of said glass tube for receiving laser beams carried by optical feed fibers from at least two laser devices;
 an opposite output end of said glass tube for delivering a composite output laser beam consisting of at least two laser beams aligned with each other in the same direction;
 wherein in said body portion the optical feed fibers entering at said input end extend through said body portion in capillary bores to said output end and are fused with said glass tube to form a component consisting of light guiding cores and encircling glass material, said cores having a refractive index that is higher than the refractive index of the glass material encircling the cores to provide for propagation of optical power in the cores through the entire component by means of total internal reflection.

According to some embodiments, the center of a first optical feed fiber in the optical component is aligned with the center of said body portion to form a first central light guiding core extending through the optical component. Also, the center of at least one second optical feed fiber may form at least one second light guiding core extending through said optical component to provide an output beam at said output end and at a predefined distance from said first central light guiding core. In a preferred embodiment, the second light guiding cores are four arranged symmetrically with respect to said central core, to provide output beams an angular distance of 90° between each other at said predefined distance from said first central light guiding core.

According to a fourth aspect of the invention, an inventive apparatus is used for laser welding. According to a fifth aspect of the invention, an inventive apparatus is used for laser cutting.

Considerable advantages are obtained by means of the invention, including:
 Reduced hardening effect in the weld seam, resulting in less deformation;
 Relaxed tolerances for cut pieces due to cleaner cut surfaces;
 Large spot and small key-hole provides better control and power
 Easier filler material feeding;
 One laser source for cutting and welding;
 Reduced cost to achieve the same result.

Next, embodiments of the invention are described in more detail with reference to the attached drawings.

BRIEF DESCRIPTION OF THE DRAWINGS

In the following, the invention is described in detail with reference to the attached drawings, wherein.

DETAILED DESCRIPTION OF EMBODIMENTS

Figure 1:
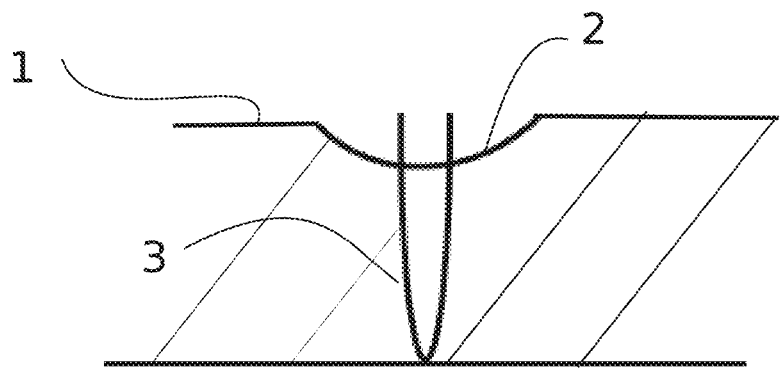
FIG. 1 shows a schematic cross-section of the impact of conduction and keyhole laser processing.

FIG. 1 shows a schematic cross-section explaining the difference in impact of conduction and keyhole laser processing. A metal sheet 1 which is processed by a diode laser capable of conduction welding or cutting, impacts a relatively shallow but wide spot 2 of the metal. Typically diode lasers of this kind have a power rating of 2 kW and a power density of well under 0.1 MW/cm$^2$. The maximum depth (and cutting capability) of the spot 2 is typically 2 mm.

A typical keyhole pattern caused by a high brightness laser, such as a fiber laser is marked with reference number 3. There is no practical limit to how thick metal sheets can be cut with such a laser, but it depends of course on the laser beam intensity and the processing speed, i.e. the speed with which the laser beam is moved across the metal surface.

Fiber lasers may have a power rating of up to 1-5 kW or more, and a power intensity of several MW/cm$^2$. The diameter of the keyhole may be in the region of less than a millimeter, 0.1 millimeter for example, and the diameter of the spot 2 may be in the region of several millimeters, such as 3 millimeters, for example.

Figure 2:
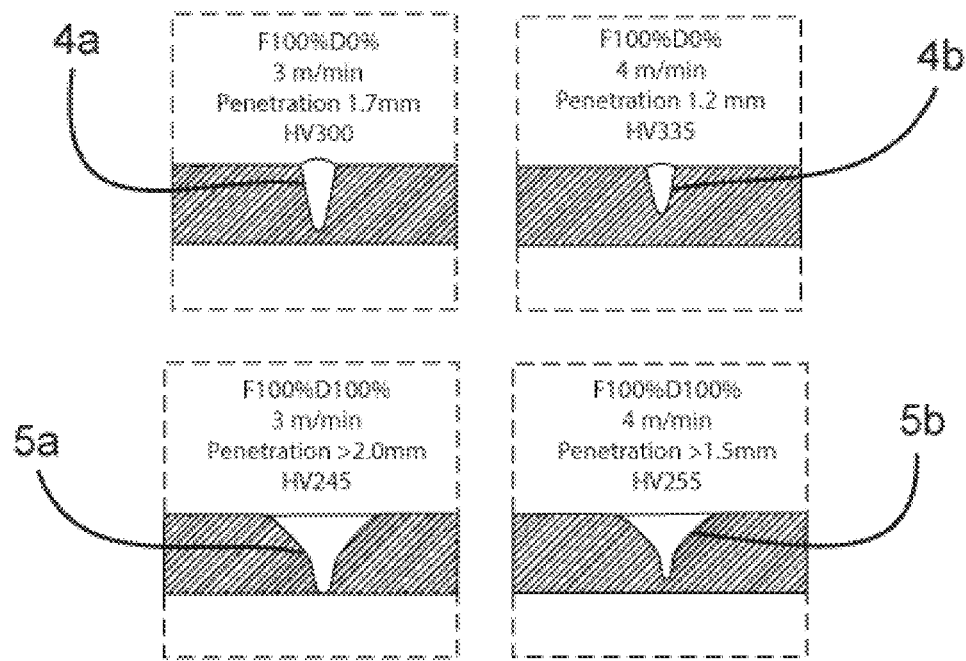
FIG. 2 shows in cross-section the differences between keyhole weld seams and the inventive hybrid weld seams.

FIG. 2 shows examples of the practical effect of the inventive hybrid laser concept. In cross-section is shown both pure keyhole weld seams and the inventive hybrid weld seams. Items 4a and 4b show keyhole welding seams with 2 different processing speeds, 3 and 4 meters/minute, respectively. Items 5a and 5b show hybrid welding seams with the same speeds. It can be noted that the penetration is at least 20% deeper in the weld seams of FIGS. 5a and 5b than in the corresponding weld seams of items 4a and 4b, the numerical values being e.g. 1.5 mmm vs. 1.2 mm in items 4b and 5b, respectively. Due to the very nature of the inventive hybrid welding, the weld seam is of course also wider. The Vickers Hardness (HV) values are also lower for the hybrid weld seams (HV245 and 255) than for the keyhole seams (HV300 and 335), indicating a lesser hardening effect in the hybrid seams. Already from these examples, it can be seen that the effects of combining keyhole and conduction laser processing is considerable.

Figure 3:
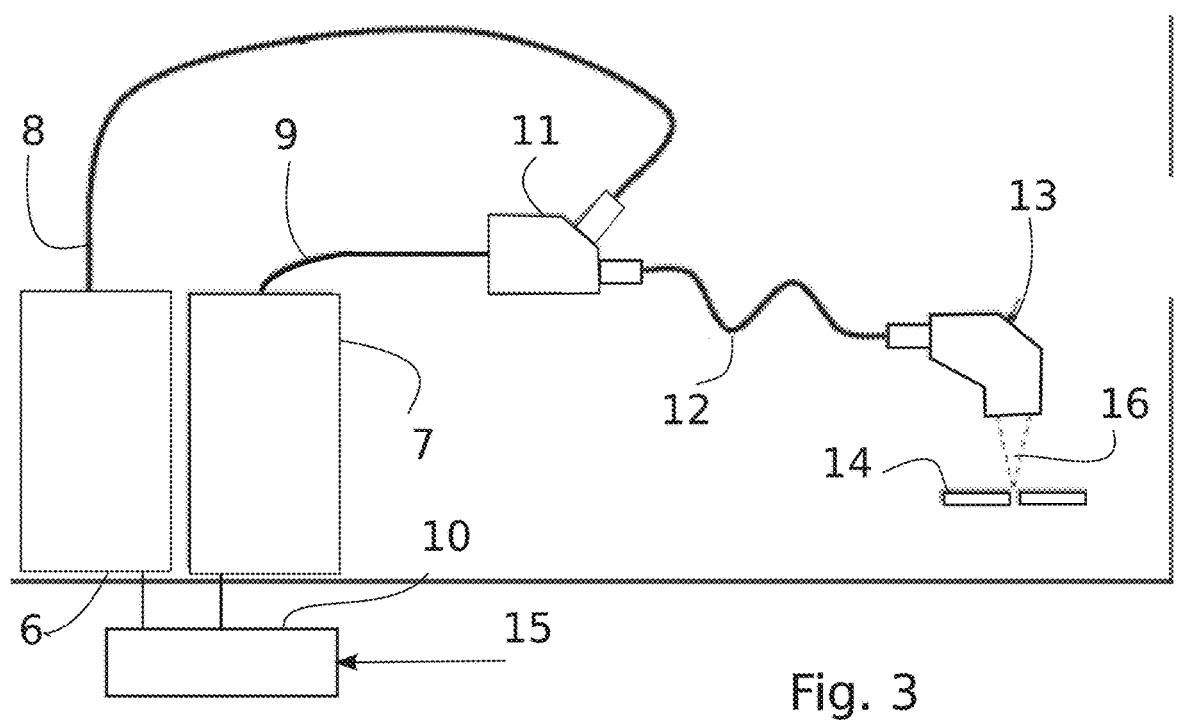
FIG. 3 shows an example of an inventive apparatus.

FIG. 3 shows one embodiment of an inventive apparatus. A high brightness fiber laser 6 is connected with an optical fiber 8 to a laser beam combiner 11. Likewise, one or several solid state or diode lasers 7 are connected with a fiber 9 to the beam combiner 11. Generally, single laser beam combiners are known in the art. In this case the task of the combiner is to arrange all incoming laser beams so that they can be coupled to a dual core optical fiber 12. Thus, the hybrid nature of the inventive laser is the result of having two laser beams propagating inside a single dual-core optical fiber 12. The two laser beams inside the fiber 12 have typically different brightness and intensity profiles, and may even have different wavelengths. Furthermore, the power levels in the two laser beams may be independently and continuously controlled by adjusting the power levels from the fiber laser 6 and solid state or diode laser 7.

In order to achieve a sufficient brightness of the beam, the high-brightness fiber laser 6 may consist of diode-pumped single or multiple fiber laser oscillator or master oscillator-power amplifier (MOPA) modules, each consisting of fiber-coupled diode lasers coupled to a fiber resonator, for example. Further examples of high-brightness lasers are fiber-coupled thin-disc lasers or Nd-YAG lasers, which are pumped with light from diode lasers. Modern laser technology frequently relies on light as energy transfer medium, as many active solid-state light amplification materials are insulators. Diode lasers have replaced previously used flash lamps because of their higher efficiency and narrower light spectrum.

The laser 7 is typically a fiber-coupled laser that may also comprise a solid-state laser resonator pumped by diode lasers, e.g. a thin-disc laser resonator (not shown). The dual core optical fiber 12 carries the laser beam from the fiber laser 6 in its center core and the beam generated by one or multiple second laser resonators 7 in an outer core which is arranged annularly around the center core, at a distance from the center core, see FIG. 5. Obviously, and in one embodiment of the invention, both first and second lasers may be fiber lasers, each having independently controllable power levels. Some lasers are fiber lasers by construction and inherently feed the light into an optical fiber, others need to be optically interfaced with a fiber in order to align the laser beam to the core of the output fiber. Thus, in some embodiments, both lasers 6 and 7 may be fiber lasers, in other embodiments any combination of fiber and solid-state or diode lasers, or both may be diode lasers. The purpose of the laser apparatus and the power ratings of the individual laser modules determine which kinds of lasers are feasible to be connected to the beam combiner 11.

The dual core optical fiber is at its opposite end connected to a laser processing head 13 which guides a combined or composite laser beam 16 onwards to a workpiece 14. The laser processing head 13 usually comprises collimating and focusing lenses (not shown) to produce an image of the intensity profile emerging from the end of the fiber 12 onto the workpiece 14 with a desired size, as determined by the focal lengths of the lenses. The task of the laser head 13 may also be to provide shielding gas to a weld seam, or pressurized gas jet to a cutting line. Pressurized gas also protects the optics within the laser head 13 from spitting molten metal, and also removes it from the cutting line helping to keep it clean.

In one embodiment of the invention, the apparatus is provided with a control unit 10. The control unit may also be integrated in one of the laser units 6 or 7. Alternatively, all units 6, 7 and 10 may be placed in a single housing and be integrated with each other in their construction, for convenience and reliability. The control unit 10 may receive feedback 15 from the user of the laser head 13, or automatic feedback e.g. from light intensity sensors. The feedback is then used to control the power of the lasers 6 and 7 to follow predetermined targets, or to adjust the laser power according to the resulting welding or cutting result observed at the workpiece 14. The control unit may consist of a general-purpose computer, for example. Such a computer may be provided with appropriate software for controlling the lasers 6 and 7 based on given input parameters and received feedback 15. Alternatively, the control unit may comprise a microcontroller, such as a Renesas RL78 or Toshiba TLCS-870 microcontroller, or similar.

According to present invention, the beam combiner 11 is made of fused silica components where optical power is propagating inside fused silica through the entire combiner structure, and the combiner has optical fibers at the input and output. Therefore, in the present invention the beam combiner 11 can be called an all-glass fiber combiner.

Figure 4:
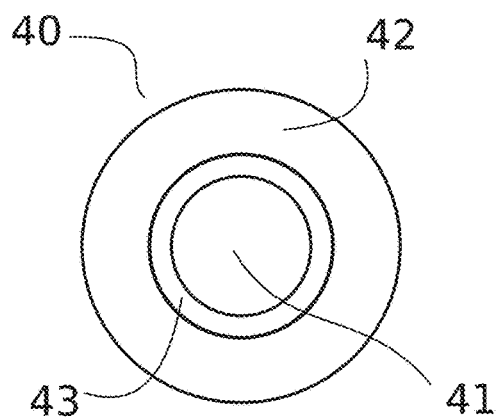
FIG. 4 shows in cross-section a composite laser beam according to the present invention.

In FIG. 4 is shown the structure of a composite laser beam 40 emerging from the laser processing head to the workpiece 14. An annular outer beam 42 is carrying the laser power provided by laser device 7, which will produce a relatively shallow but wide spot on the workpiece, cf. FIG. 1. Correspondingly, an inner beam 41 is carrying the laser power provided by fiber laser device 6, and will cause a keyhole pattern in the workpiece, due to its higher brightness. Between the beams is an annularly shaped zone 43, which provides only stray or no laser radiation at all.

Figure 5:
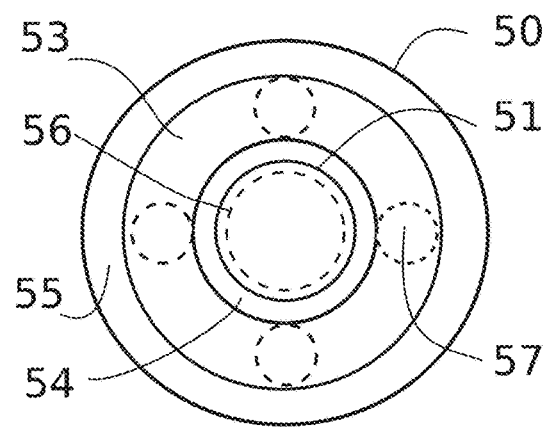
FIG. 5 shows a cross-section of a receiving end of an inventive coupling means.

In FIG. 5 is shown a cross-section of a dual core optical fiber 50, having a central core 51 with a primary cladding 54. The outer core 53 is spatially formed by the inner cladding 54 and the outer cladding 55. As is clear to anyone familiar with the art, the cladding is defined as a material having a lower refractive index than that of the core. The diameter of the central core 51 may be 70 µm, and the inner and outer diameters of the outer core 53 may be 100 µm and 180 µm, respectively. The central and peripheral cores 51 and 53 may also take other forms than those described above. The central core 51 may be of a square or rectangular shape, for instance. The peripheral core 53 may also have rectangular boundaries or be composed of multiple segments of linear or circular shapes.

With dashed lines is shown how the cores of the ends of fused feed fibers 56 and 57 (fibers 72 and 71 in FIG. 7) from the beam combiner may align with the cross-section of the dual core optical fiber 50.

The laser radiation in the central core 51 of the dual core optical fiber 50 has a central and narrow spatial intensity profile, while the intensity distribution in the outer core 53 is taking the shape of a doughnut. This spatial intensity pattern is further imaged with processing optics in the laser head 13 onto the workpiece. With this configuration, the beam quality of the laser beam is relatively high both in the center and outer cores. However, due to differences in shapes and cross-section areas, the inner core can produce a better beam quality than the outer core and is therefore better aimed at cutting thin materials and workpieces, or making piercing in cutting of thick materials. For thicker materials, the disadvantages of a somewhat lower beam quality produced by the outer core are outweighed by the combined processing speed and cleanliness of the weld seam or cutting surfaces due to the ring-like intensity distribution of the outer core. The power intensities of the inner and outer cores are adjustable individually and according to the requirements of the workpiece, by adjusting the power of the originating laser sources.

Figure 6:
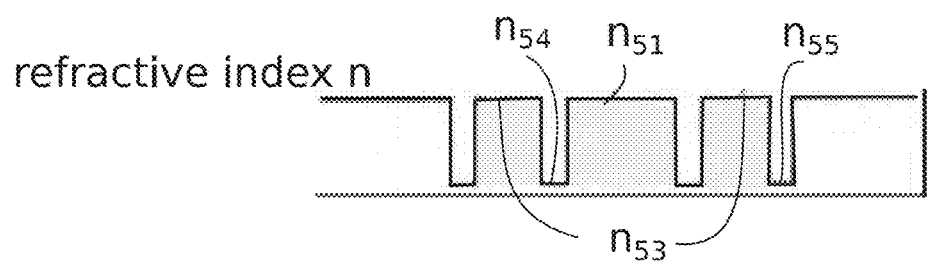
FIG. 6 illustrates the refractive index profile at the output of an inventive coupling means.

Referring now to FIG. 6, an exemplary refractive index profile of an optical dual core fiber 50 is shown. The cores 51 and 53 must have a refractive index $n_{51}$ and $n_{53}$ that is higher than the indexes $n_{54}$ and $n_{55}$ of the encircling materials 54 and 55 respectively. In this way the laser beam is guided to a workpiece to be e.g. cut with the least possible degradation in the annular intensity profile and attenuation of the optical power and intensity in each of the cores, cf. FIG. 4.

The refractive index of fused silica can be adjusted by doping it with impurities. Doping fused silica with Germanium results in an increase of the refractive index, while doping it with Fluorine results in reduction of the refractive index. Therefore the cores 51 and 53 may be made of Ge-doped or un-doped fused silica, and their primary claddings 54 and 55 of F-doped fused silica, for example.

Figure 7:
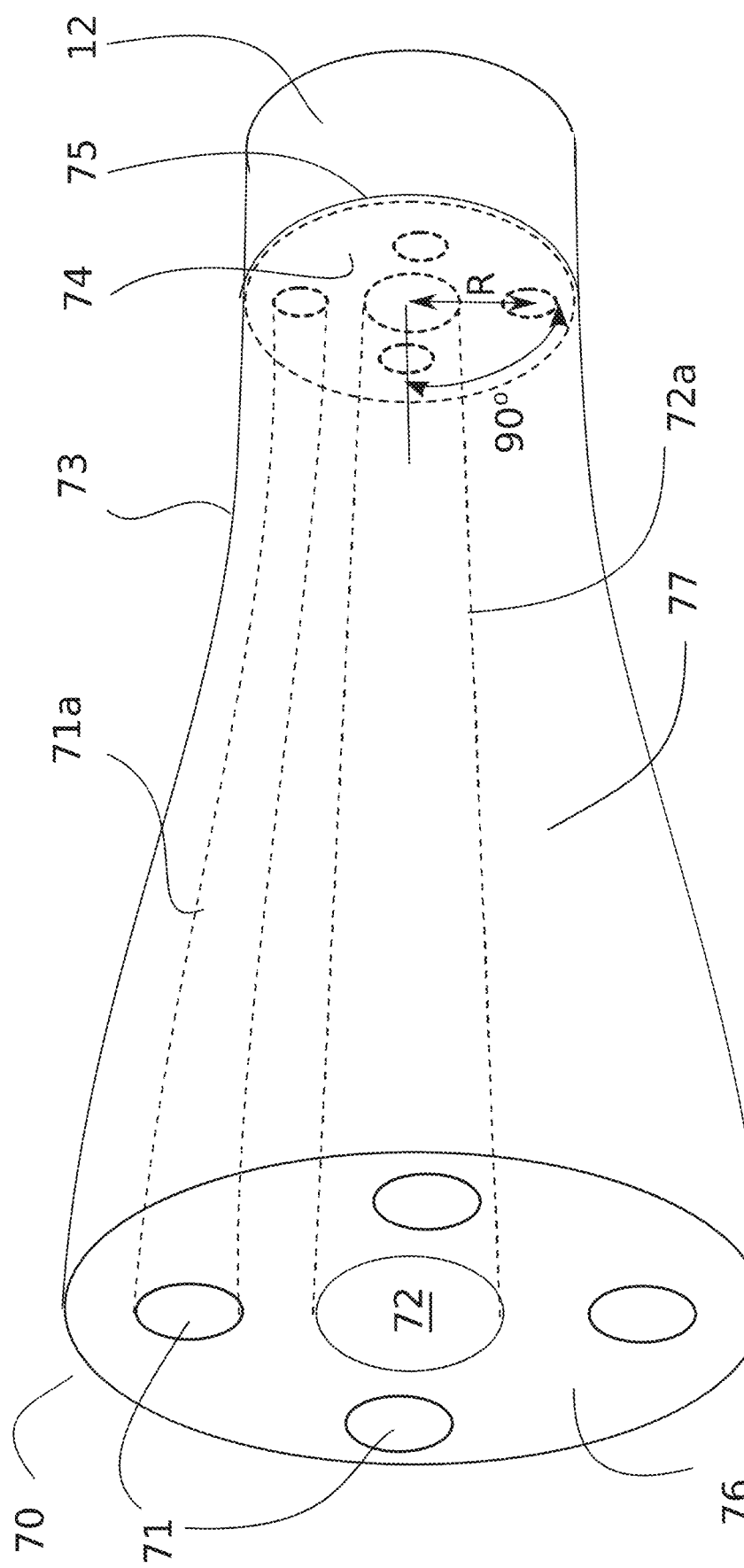
FIG. 7 shows schematically an optical component according to the present invention.

In FIG. 7 is shown the key optical component 70 of the fiber combiner 11. It is a multi-bore capillary tube having a body portion consisting of a fused silica glass tube 77, an input end 76 for receiving laser beams (not shown) carried by optical feed fibers 71 and 72 from at least two laser devices (e.g. fibers 8 and 9 from devices 6 and 7). It also has an opposite output end 74 for delivering a composite output laser beam consisting of at least two laser beams aligned with each other in the same direction.

The optical feed fibers 71, 72 entering at the input end 76 extend through said body portion in capillary bores to said output end 74, and are fused with the glass tube 77 to form a component consisting of light guiding cores 71a, 72a and encircling glass material. The cores have refractive index that is higher than the refractive index of the encircling glass material around the cores to provide for propagation of optical power in the cores through the entire component by means of total internal reflection.

To show the principle of the fiber combiner, the dimensions of the cores and the dimensions of the component 70 are not in scale, and for clarity, only a couple of the cores are shown with dashed lines.

An optical component 70 may be manufactured by e.g. drawing. In this example, there may be a larger bore for the fiber 72 of about 300 μm in diameter in the center and four smaller bores for fibers 71 placed symmetrical and peripheral to the center bore 72. The smaller bores may have a diameter of about 150 μm, for example. The outside diameter of the capillary tube may be 1 mm. The material of the tube may be fused silica, for instance. The fibers, whose outer cladding of bulk glass (not shown) has preferably been etched away at least partly, are inserted into the middle bores and pushed through to a waist part 73 of the capillary taper. When the fibers are in place, the capillary tube 70 is heated at the waist section 73 to fuse the fibers to the tube and to form a first central light guiding core 72a and second light guiding cores 71a, which all extend through the optical component 70.

The fibers 71, 72 may as an alternative have an inner core of pure fused silica material and an outer cladding of F-doped silica. In this way, the fused silica glass tube 77 of the optical component 70 may be manufactured from pure fused silica, because the light-guiding cores of the fibers are inherently surrounded with a lower refraction index. This means the light remains in the cores 71a, 72a even if the refraction index of the capillary tube is the same as in the fiber cores. In this case, the outer fiber cladding of bulk glass may be etched away down to the F-doped cladding, or even further, as long as some F-doped cladding remains around the pure or Ge-doped inner fiber core.

The fused cores 71a, 72a (shown with dashed lines) and tube 70 is then cut off or cleaved to create an end surface 74. A dual core fiber 12 like the one shown in FIG. 3 may then be welded to the capillary tube at the end 74, resulting in a seam 75.

In preferred embodiments, the center of the first optical feed fiber 72 is aligned with the center of the component 70, and the centers of, for example, four second optical feed fibers 71 are located to provide an output beam at the output end 74 at a predefined distance R from the first central light guiding core 72a. The second light guiding cores 71a are preferably arranged symmetrically with respect to the central core 72a, to provide output beams with an angular distance of 90° between each other.

It is to be understood that the embodiments of the invention disclosed are not limited to the particular structures, process steps or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:
1. A laser processing apparatus comprising:
   at least one first laser device, each providing at least one first optical feed fiber with a first laser beam;

at least one second laser device, each providing at least one second optical feed fiber with a second laser beam;

a beam combiner connected to said first and second feed fibers and to a multi-core optical fiber, the beam combiner being adapted to form a composite laser beam by having in said multi-core optical fiber a first core with a circular cross-section located in a center of said multi-core optical fiber, and a second core with an annular shape concentric to said first core; wherein a center of the first optical feed fiber is aligned with said first core and the center of the second optical feed fiber is aligned between the inner and outer diameters of said annular second core and wherein the ends of the feed fibers are fused within a glass tube and the glass tube is welded to the multi-core optical fiber; wherein said first and second cores being connected to a laser processing head, to direct a composite laser beam comprising first and second output laser beams to a workpiece to be processed; and a control unit functionally connected to said first and second laser devices, to individually control the power levels of the first and second laser devices to simultaneously control the power density in both said first and second output laser beams.

2. The apparatus according to claim 1, wherein the second optical feed fibers are four and symmetrically interfaced with the cross-section of said second annular core of said multi-core optical fiber.

3. The apparatus according to claim 1, wherein said at least one first laser device is a fiber laser.

4. The apparatus according to claim 1, wherein said at least one second laser device is a diode laser.

5. The apparatus according to claim 1, wherein both the first and the second laser devices are fiber lasers.

6. A method for processing a workpiece with a laser beam, comprising of the steps of:

providing at least one first laser beam from at least one first optical feed fiber connected to at least one first laser device;

providing at least one second laser beam from at least one second optical feed fiber connected to at least one second laser device;

combining said first and second laser beams in a multi-core optical fiber by aligning said at least one first optical feed fiber with a first core having a circular cross-section and located in the center of said multi-core optical fiber and by aligning said at least one second optical feed fiber with a second core having an annular shape concentric to said first core of said multi-core optical fiber wherein a center of said first optical feed fiber is aligned with said first core and a center of at least one second optical feed fiber is aligned between the inner and outer diameters of said annular second core; and wherein the ends of the feed fibers are fused within a glass tube and the glass tube is welded to the multi-core optical fiber directing a composite laser beam comprising first and second output beams from said multi-core optical fiber to a workpiece to be processed; and individually controlling with a control unit which is functionally connected to said first and second laser devices, the power levels of the first and second laser devices to simultaneously control the power density in both said first and second output beams individually.

* * * * *